US010819797B2

(12) United States Patent
Momchilov et al.

(10) Patent No.: US 10,819,797 B2
(45) Date of Patent: Oct. 27, 2020

(54) COMPUTING SYSTEM PROVIDING SAAS APPLICATION INTEGRATION WITH INTERNET OF THINGS (IOT) SENSORS THROUGH AUTOMATED APPLICATION PROGRAM INTERFACE (API) GENERATION AND RELATED METHODS (71) Applicant: CITRIX SYSTEMS, INC., Fort Lauderdale, FL (US)

(72) Inventors: Georgy Momchilov, Parkland, FL (US); Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 56 days.

(21) Appl. No.: 16/273,429

(22) Filed: Feb. 12, 2019

(65) Prior Publication Data
US 2020/0259903 A1 Aug. 13, 2020

(51) Int. Cl.
*G06F 15/16* (2006.01)
*H04L 29/08* (2006.01)
*G06F 9/54* (2006.01)
*G06F 40/174* (2020.01)
*G06F 40/186* (2020.01)

(52) U.S. Cl.
CPC .......... *H04L 67/125* (2013.01); *G06F 9/541* (2013.01); *G06F 40/174* (2020.01); *G06F 40/186* (2020.01); *H04L 67/025* (2013.01)

(58) Field of Classification Search
CPC ... H04L 67/125; H04L 67/025; G06F 40/186; G06F 40/174; G06F 9/541
See application file for complete search history.

(56) References Cited

U.S. PATENT DOCUMENTS

| 9,176,744 | B2 | 11/2015 | Lee |
| 9,516,053 | B1 | 12/2016 | Muddu et al. |
| 9,538,345 | B2 | 1/2017 | Sah et al. |
| 2017/0006135 | A1 | 1/2017 | Siebel et al. |
| 2017/0083368 | A1 | 3/2017 | Bishop et al. |
| 2017/0083386 | A1 | 3/2017 | Wing et al. |
| 2017/0085445 | A1 | 3/2017 | Layman et al. |
| 2017/0091277 | A1 | 3/2017 | Zoch |
| 2017/0168777 | A1* | 6/2017 | Britt .................. G06F 8/20 |
| 2017/0201504 | A1* | 7/2017 | Funk .................. H04L 63/0471 |
| 2017/0289253 | A1 | 10/2017 | Graefe et al. |

(Continued)

FOREIGN PATENT DOCUMENTS

| CN | 102842076 | 12/2012 |
| WO | WO 2017/210120 | 12/2017 |

*Primary Examiner* — Philip B Tran
(74) *Attorney, Agent, or Firm* — Allen, Dyer, Doppelt + Gilchrist, P.A.

(57) ABSTRACT

A computing system may include a server configured to provide Software as a Service (SaaS) application sessions and at least one client computing device cooperating with the server to run a first one of the SaaS application sessions having a form including an input data field, and generate an application program interface (API) based upon the input data field from the form. The at least one client computing device may further link an output of an Internet of Things (IoT) sensor corresponding to the input data field to the API, and collect data output from the IoT sensor and populate the input data field in the form via the API.

20 Claims, 8 Drawing Sheets (56) References Cited

U.S. PATENT DOCUMENTS

| | | | | |
|---|---|---|---|---|
| 2017/0351504 A1* | 12/2017 | Riedl | ................ | G06F 3/002 |
| 2017/0366969 A1* | 12/2017 | Syed | ................ | H04W 12/0804 |
| 2017/0374154 A1* | 12/2017 | Hamill | ................ | H04W 4/18 |
| 2018/0183685 A1* | 6/2018 | Cook | ................ | H04L 12/4641 |
| 2018/0285810 A1 | 10/2018 | Ramachandran et al. | | |
| 2018/0314808 A1* | 11/2018 | Casey | ................ | H04L 41/082 |
| 2019/0104409 A1* | 4/2019 | Wu | ................ | H04W 64/003 |

* cited by examiner

COMPUTING SYSTEM PROVIDING SAAS APPLICATION INTEGRATION WITH INTERNET OF THINGS (IOT) SENSORS THROUGH AUTOMATED APPLICATION PROGRAM INTERFACE (API) GENERATION AND RELATED METHODS

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A computing system may include a server configured to provide Software as a Service (SaaS) application sessions and at least one client computing device cooperating with the server to run a first one of the SaaS application sessions having a form including an input data field, and generate an application program interface (API) based upon the input data field from the form. The at least one client computing device may further link an output of an Internet of Things (IoT) sensor corresponding to the input data field to the API, and collect data output from the IoT sensor and populate the input data field in the form via the API.

In an example embodiment, the first SaaS application session may correspond to a first SaaS application, and the at least one client computing device may be further configured to run a second one of the SaaS application sessions corresponding to a second SaaS application different than the first SaaS application and provide data output from the IoT sensor and collected via the API to the second SaaS application session. By way of example, the at least one client computing device may be configured to dynamically generate the API based upon the input data field from the form. In accordance with another example, the at least one client computing device may be configured to generate the API based upon an API template library.

The at least one client computing device may run the first SaaS application session within an embedded browser, and the form may comprise a web browser form, for example. In an example implementation, the at least one client computing device may be further configured to output a control parameter for the IoT sensor via the API. For example, the control parameter may comprise at least one of a power control parameter and a sensor configuration parameter. In still another example implementation, the at least one client computing device may be configured to run an IoT hub application to generate the API and link the output of the IoT sensor to the API.

A related method may include providing SaaS application sessions at a server, running a first one of the SaaS application sessions at a client computing device having a form including an input data field, and generating an API at the client computing device based upon the input data field from the form. The method may further include linking an output of an IoT sensor corresponding to the input data field to the API at the client computing device, and collecting data output from the IoT sensor and populating the input data field in the form via the API at the client computing device.

A related non-transitory computer-readable medium is also provided having computer-executable instructions for causing a client computing device to perform steps including running a first SaaS application session from a server and having a form including an input data field, and generating an API based upon the input data field from the form. The steps may further include linking an output of an IoT sensor corresponding to the input data field to the API, and collecting data output from the IoT sensor and populating the input data field in the form via the API.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
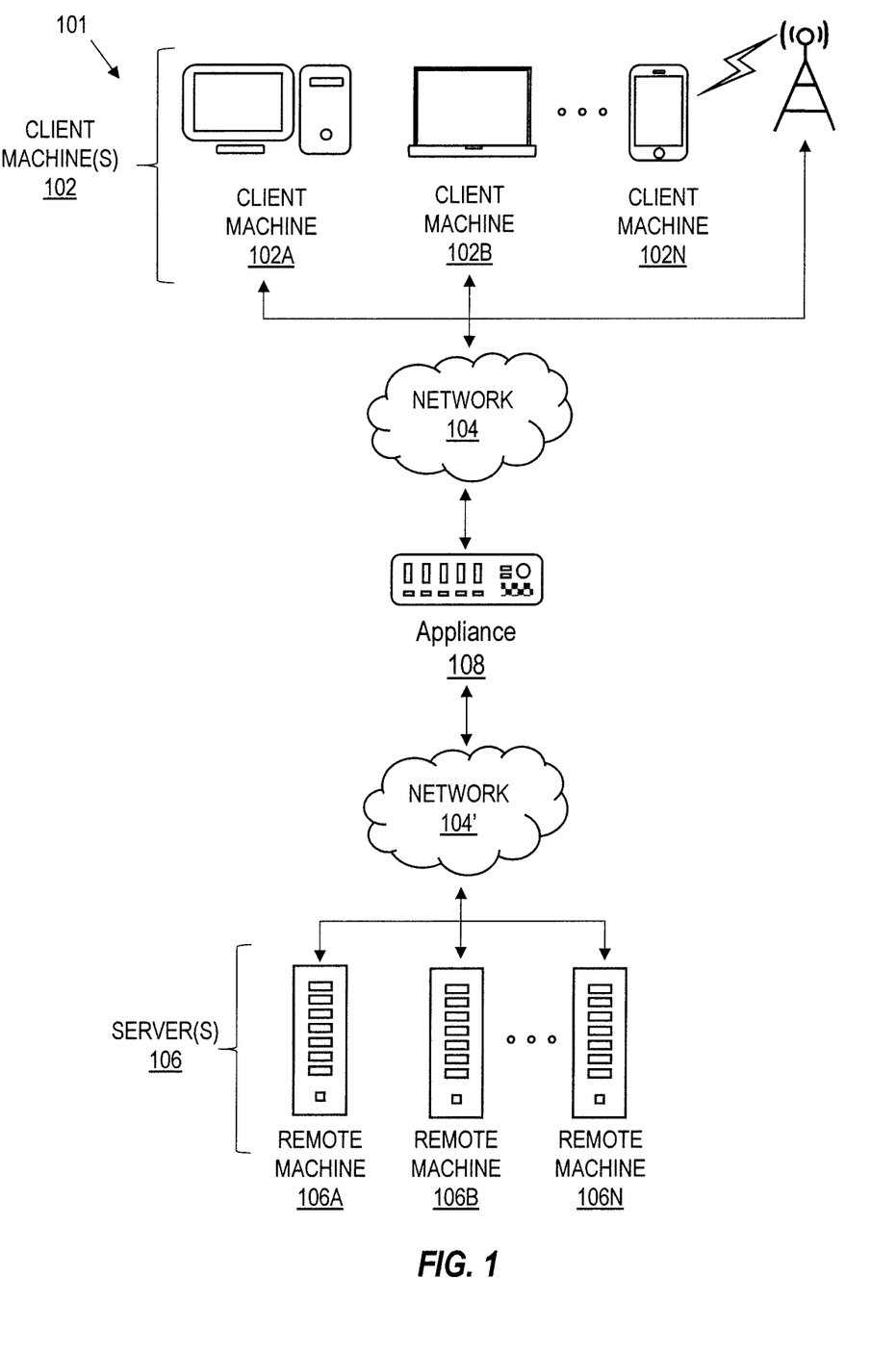
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security (TLS) Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network104 may be: a local-area network (LAN); a metropolitan area network (MAN); a wide area network (WAN); a primary public network104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
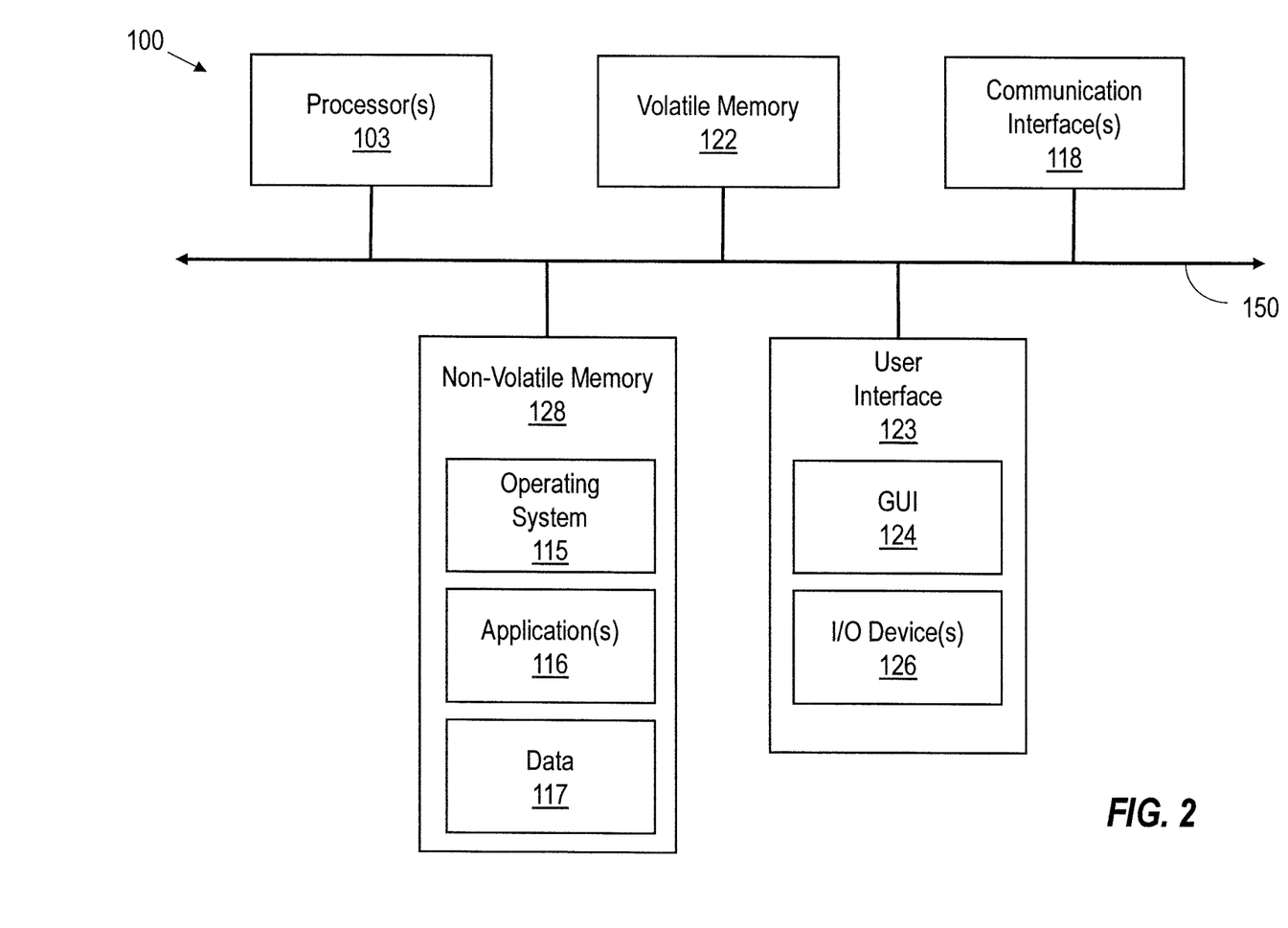
FIG. 2 is a block diagram of a computing device useful for practicing an embodiment of the client machinesor the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
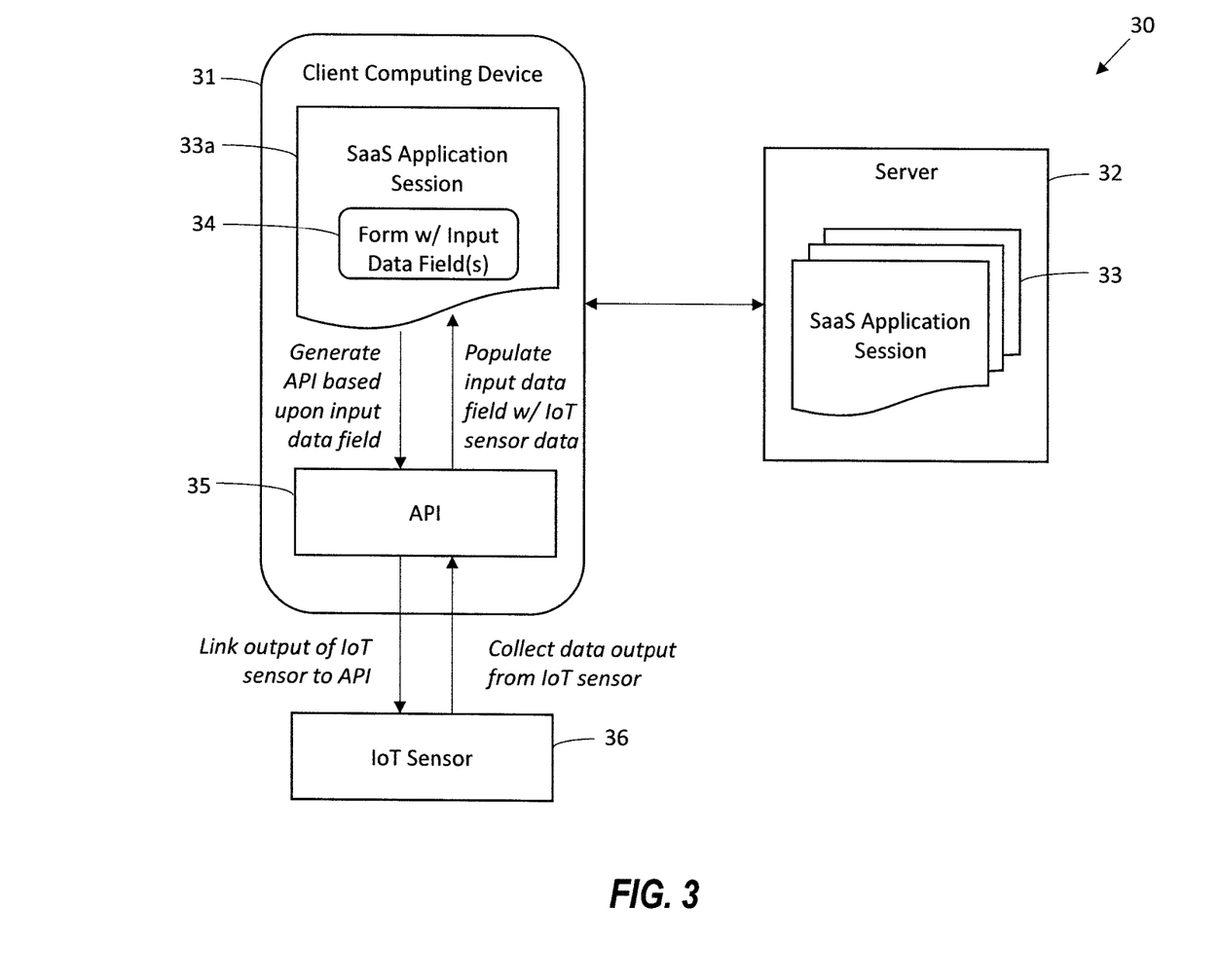
FIG. 3 is a schematic block diagram of a computing system in accordance with an example implementation providing Application Program Interface (API) generation for Internet of Things (IoT) sensor integration with a Software as a Service (SaaS) application.

Turning to FIG. 3, a computing system 30 is now described which advantageously provides an automated approach to creating a data interface between Software as a Service (SaaS) applications and Internet of Things (IoT) sensors. More particularly, with the ever-improving wireless communications infrastructure and available communications bandwidth, it is now practical for computing devices to connect with different types of IoT sensors to collect and monitor numerous types of data. For example, IoT sensors may be used to collect various types of measurable data about an environment or subject, such as temperature, pressure, movement, etc. As such, these sensors may be deployed in numerous applications including remote equipment monitoring (e.g., HVACR or other equipment in a building), patient monitoring in a medical facility or hospital, and many others.

Yet, a challenge that arises with the availability of numerous generic IoT sensors is how to import such data into different applications, which are not designed for use with specific types of sensors, and without burdensome manual data entry. For example, SaaS applications are run as hosted sessions on a remote server which are shared by numerous different users from potentially many different enterprises. To customize such applications to work with all of the different types of available IoT sensors that may be used by all of these different enterprises would be difficult and cost prohibitive. That is, to get such information into a SaaS application input form, for example, would ordinarily require manual entry of the sensor data into this form by a user. The system 30 advantageously provides a technical solution to these deficiencies by providing an automated approach to generating Application Program Interfaces (APIs) that provide a data interface between SaaS application sessions and IoT sensors, allowing not only for automated collection and input of IoT sensor data, but also the ability for the SaaS application sessions to control the IoT sensors as well. Thus, the approach set forth herein advantageously provides improved operation within virtualized and/or SaaS computing systems through automated IoT sensor data integration and data collection.

More particularly, the system 30 illustratively includes a server 32 configured to provide SaaS application sessions 33 for one or more client computing devices 31. By way of example, the illustrated server 32 may be implemented as one or more servers in different embodiments, such as a cloud computing server cluster. Moreover, the system 30 may be used with different SaaS application providers each using different respective servers to provide their own SaaS application sessions. Furthermore, in some embodiments the SaaS application sessions may be provided through an intermediary server, such as a virtualization server(s) which provides managed access to enterprise resources and applications (including native and/or Web/SaaS applications) for a group of client computing devices 31 within a common enterprise (e.g., within the same corporation or organization, government entity, etc.). Such configurations may be implemented using systems including Citrix Workspace, XenApp, and XenDesktop, for example, which provide a managed access infrastructure for enterprise resources and desktop/application sessions, although other suitable systems may also be used in different embodiments. Thus, it will be understood that reference to the server 32 is intended to cover all of these different implementations, as well as other server configurations which may be used for providing access to SaaS application sessions 33 in different embodiments.

By way of example, the client computing device 31 may be a tablet computer, desktop computer, laptop computer, smartphone, etc. The client computing device 31 cooperates with the server 32 to run a first one of the SaaS application sessions 33a having a form 34 including one or more input data fields. The client computing device 31 advantageously generates an API 35 based upon the input data field from the form 34. Furthermore, the client computing device 31 also links an output of one or more IoT sensors 36 corresponding to the input data field to the API 35, so that it may collect data output from the IoT sensor and populate the input data field in the form 34 via the API.

Figure 4:
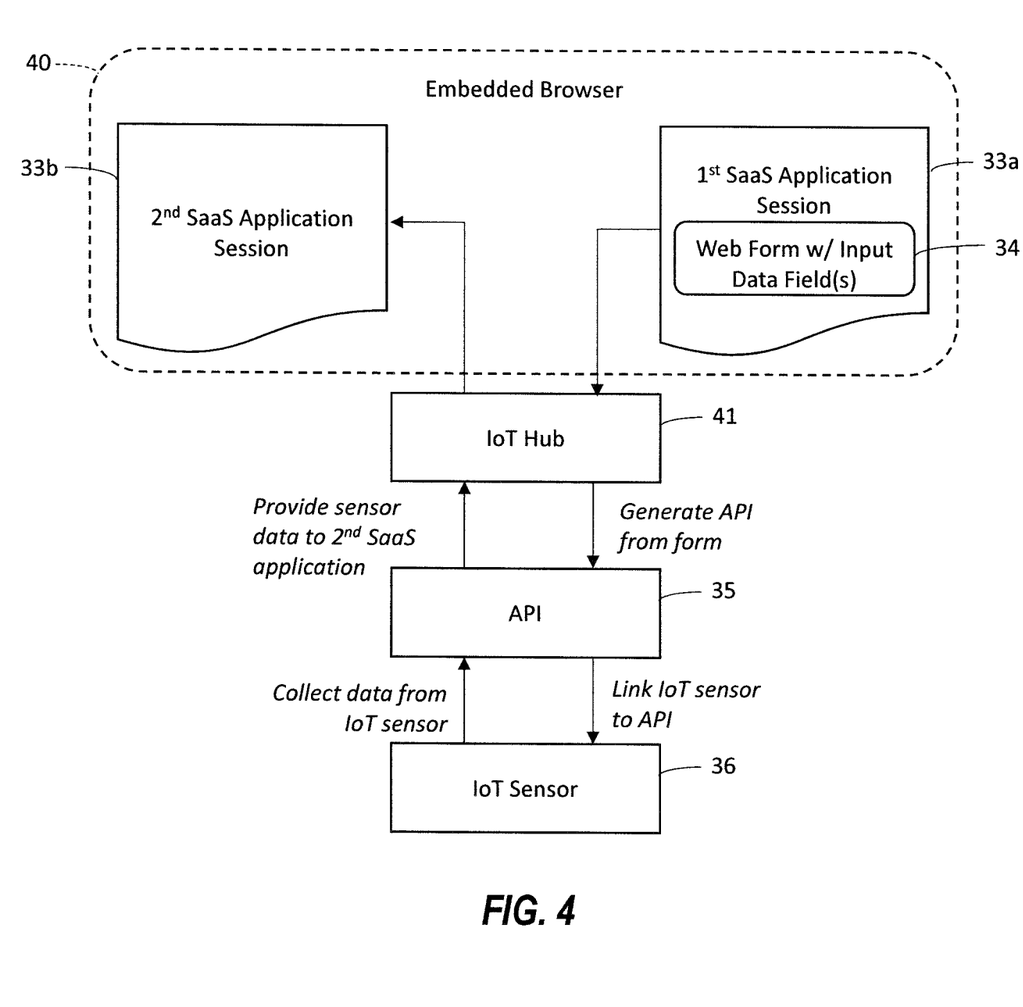
FIG. 4 is a schematic block diagram of an example embodiment of the system of FIG. 3 in which data collected from an IoT sensor via the generated API may be shared between different SaaS applications.

In an example implementation now described with reference to FIG. 4, the first SaaS application session may correspond to a first SaaS application that runs within an embedded browser 40 at the client computing device 31. By way of example, the embedded browser 40 may be part of client-side enterprise management access application, such as the Citrix Workspace or Receiver applications, although other suitable applications may be used in different embodiments. Furthermore, the client computing device 31 in this embodiment also runs a second one of the SaaS application sessions 33b corresponding to a second SaaS application different than the first SaaS application, as well as an IoT hub 41. The IoT hub 41 may also be part of the client-side enterprise management access application, and accordingly will have access to the browser commands/markup language being used within the first SaaS application session. The IoT hub 41 may accordingly not only be used to generate the API 35 from the web form 34, but also communicate with the second SaaS application session 33b to provide data output from the IoT sensor 36 and collected via the API 35 to the second SaaS application session.

Figure 5:
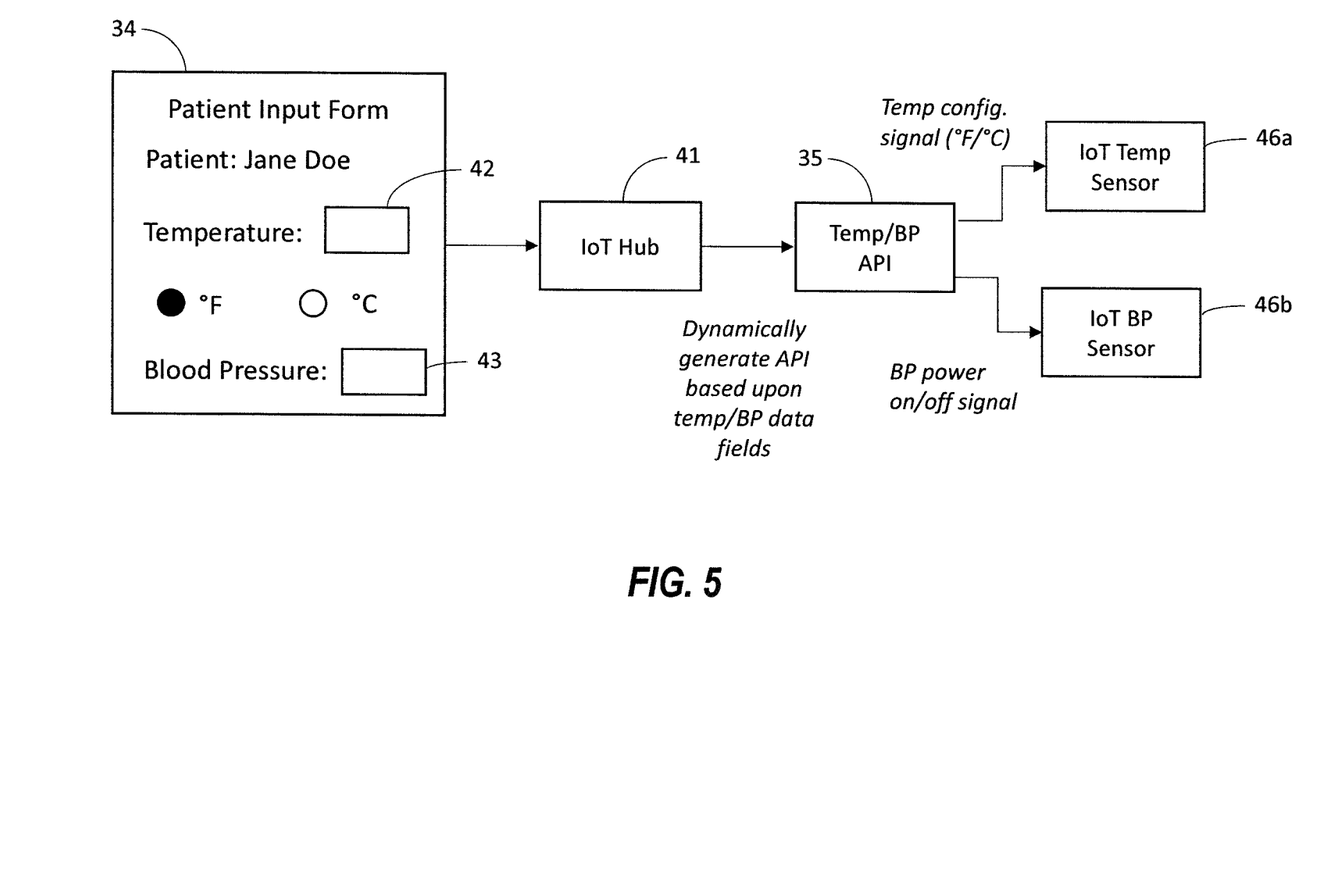
FIG. 5 is a schematic block diagram of an example implementation of the system of FIG. 3 illustrating a dynamic API generation for multiple IoT sensors.
Figure 6:
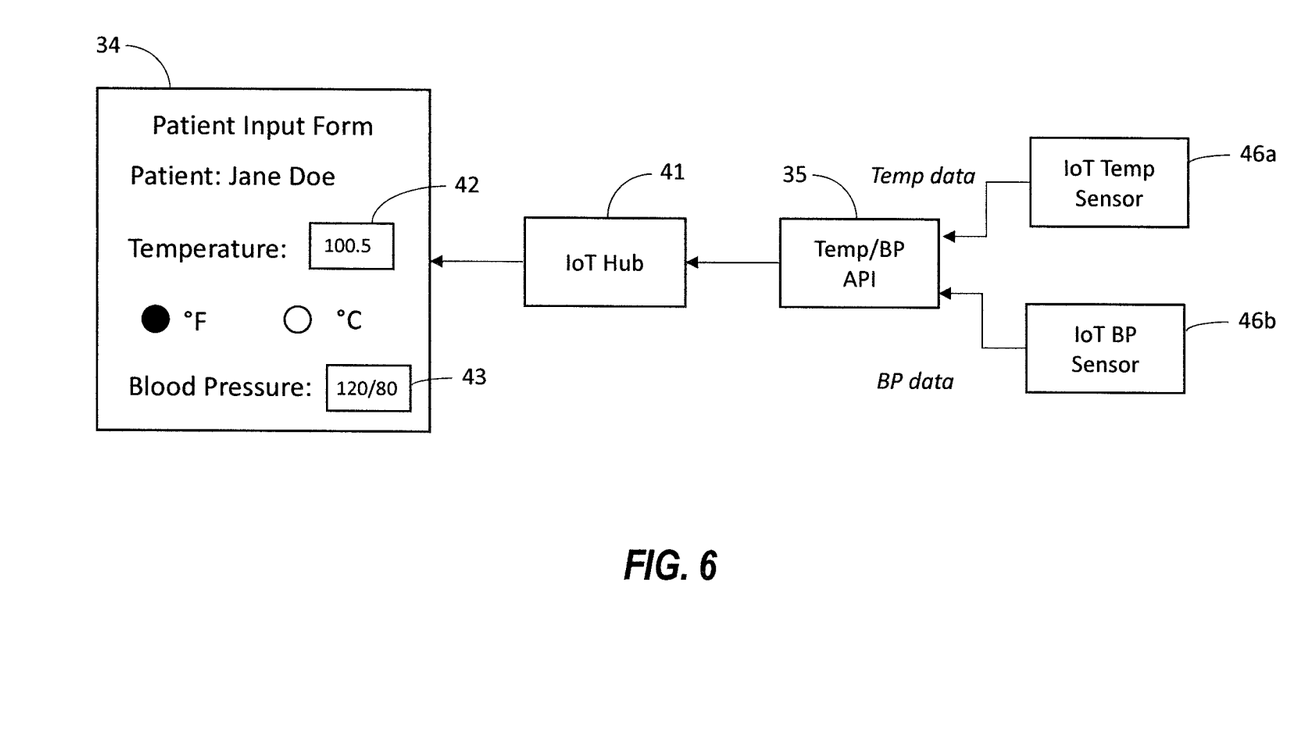
FIG. 6 is a schematic block diagram of the system of FIG. 5 illustrating the population of SaaS application form fields from IoT sensor data.

Referring additionally to FIGS. 5 and 6, one example implementation for dynamically generating the API 35 is now described. In this example implementation, the web form 34 is for collecting patient data in a medial setting and includes an input data field 42 for patient temperature, and an input data field 43 for patient blood pressure. In this example, a separate IoT temperature sensor 46a and IoT blood pressure sensor 46b are used to collect patient temperature and blood pressure data, respectively. The client-side IoT hub 41 processes the web page having the form 34 thereon to dynamically generate the API 35. In this way, forms within the embedded browser 40 in which the SaaS application is running are now turned into connectors for the client-side IoT hub 41 to automatically feed data into not only the first SaaS application session 33a, but the second SaaS application session 33b (and/or others) as well. The same IoT hub 41 may advantageously be used to communicate between different SaaS apps and automatically generate data feeds from a web page in the SaaS application session 33a to a web page in SaaS application session 33b, for example.

In the present example, the IoT hub 41 recognizes the data fields 42, 43 within the form 34 and generates the temperature/blood pressure API 35 to accept temperature and blood pressure inputs, and when the sensors 46a, 46b are paired with the client computing device 31 the IoT hub registers the sensors and their respective outputs to the API as the temperature and blood pressure inputs. In different embodiments, different respective APIs may be used for different input fields in the form 34, if desired. As such, as temperature and blood pressure measurements are taken by the IoT sensors 46a, 46b, respectively, this data is provided to the API 35, and the IoT hub 41 in turn uses this data to populate the respective data fields 42, 43 in the form 34 as shown. In the present example, a patient temperature of 100.5° F. is populated in the temperature form field 42, and a blood pressure reading of 120/80 is populated in the blood pressure form field 43 (see FIG. 6).

Furthermore, in the example implementation the IoT hub 41 is also advantageously configured to output one or more control parameters for the IoT sensors 46a, 46b via the API 35 (see FIG. 5). More particularly, a temperature sensor configuration command is sent to the IoT temperature sensor 46a to configure this sensor to provide temperature data using the desired scale (here Fahrenheit instead of Celsius). Moreover, a power control parameter is sent to the IoT blood pressure sensor 46b to selectively power the sensor on and off. For example, a patient in an ICU at a hospital may have a blood pressure monitor connected to him for an extended period, and the power control command may be sent periodically to cause the sensor to take a blood pressure measurement at desired intervals. It will be appreciated that these are but a few examples of control commands that may be sent to different types of IoT sensors, and that numerous other types of sensors may be used with the system 30 with different control commands and to collect different types of data as well.

Figure 7:
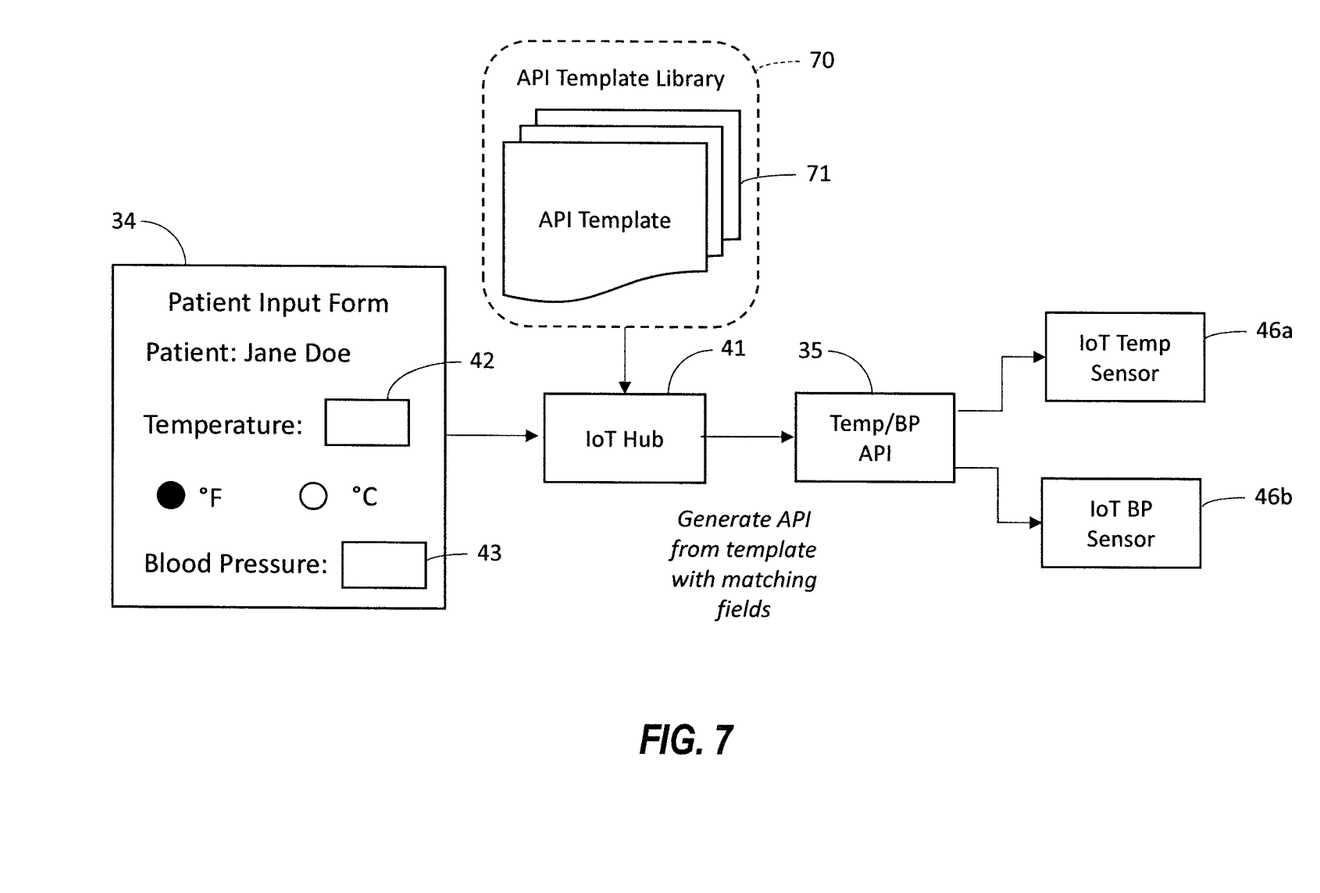
FIG. 7 is a schematic block diagram of an example implementation of the system of FIG. 3 illustrating generation of an API for multiple IoT sensors using an API template library.

Another example approach to generating the API 35 is now described with reference to FIG. 7. Here, the IoT hub 41 generates the API 35 based upon a library 70 of API templates 71. More particularly, upon determining the form fields 42, 43 in the form 34, the IoT hub 41 may search the template library 70 for a template(s) 71 corresponding to the form fields. The IoT hub 41 may then link the selected API template to the IoT sensors 46a, 46b when paired with the client computing device 46a, 46b. In some embodiments, a hybrid dynamic/library approach may be used in which the IoT hub 41 selects a base template 71 matching one or more of the form fields 42, 43, but then dynamically modifies or changes the template as appropriate for the given implementation.

More particularly, the IoT hub 41 may parse the SaaS application web page and find elements with patterns, e.g. text fields, labels, sliders. Then IoT hub 41 may find elements with certain names (e.g., temperature) located next to other labels (e.g., blood pressure), or sharing a pane/group/tab with other data, e.g., "life monitoring" data group, etc. Then input from the IoT devices 46a, 46b may be generically injected based on the API 35 which looks for SaaS page elements identified by any combination of element patterns, attributes/properties, conditions, and/or events. This advantageously provides a relatively flexible and maintainable approach compared with hard-coding input injection based on page-specific APIs, for example.

Figure 8:
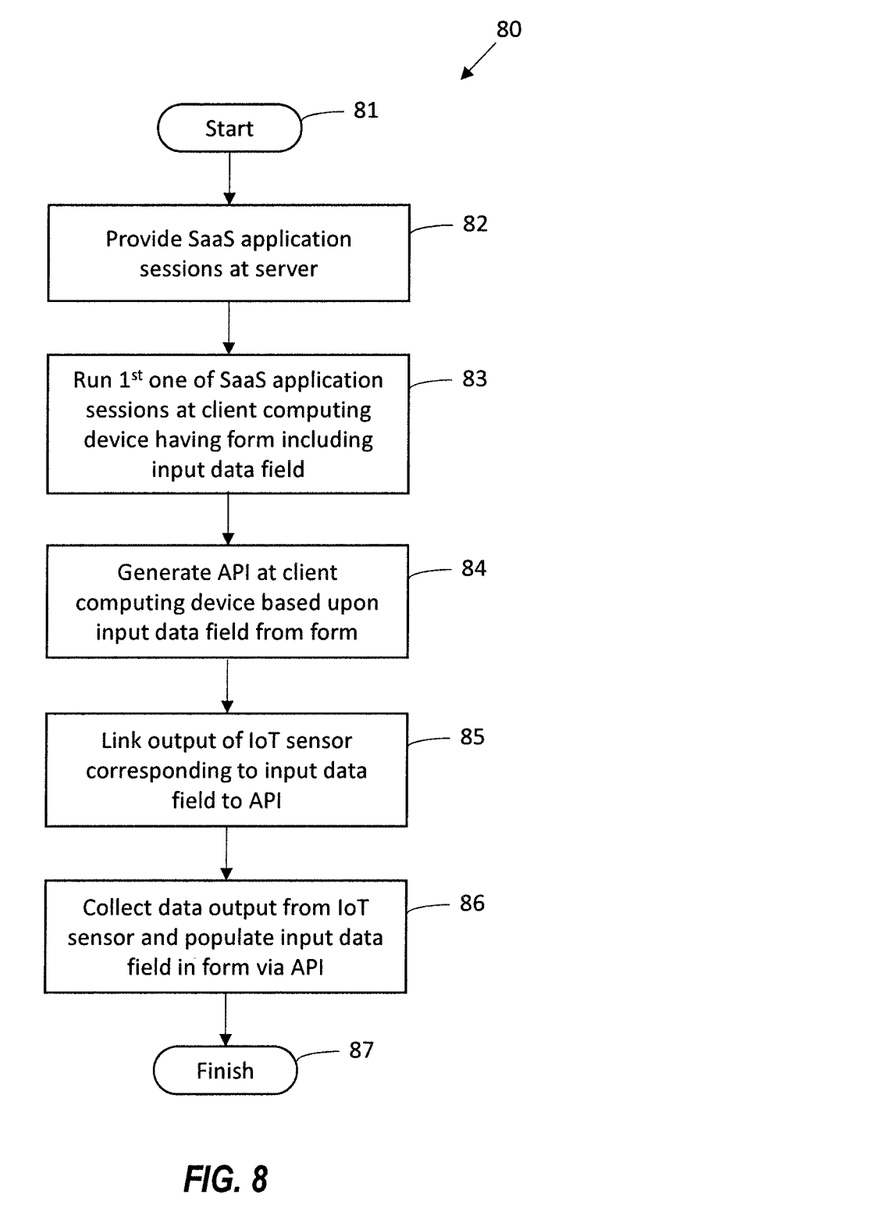
FIG. 8 is a flow diagram illustrating method aspects associated with the system of FIG. 3.

A related method is now described with reference to the flow diagram 80 of FIG. 8. Beginning at Block 81, SaaS application sessions 33 are provided by the server 32, at Block 82, and a first one of the SaaS application sessions 33a is run at the client computing device 31 (Block 83). The SaaS application session 33a has the form 34 therein including one or more input data fields, and the client computing device 31 generates the API 35 based upon the input data field(s) from the form (Block 84), as discussed further above. The method further illustratively includes linking an output of the IoT sensor 36 corresponding to the input data field(s) to the API 35, at Block 85, and collecting data output from the IoT sensor 36 and populating the input data field in the form 34 via the API 35, at Block 86. The method of FIG. 8 illustratively concludes at Block 87.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
 a server configured to provide Software as a Service (SaaS) application sessions; and
 at least one client computing device cooperating with the server to
  run a first SaaS application session having a form including an input data field,
  generate an application program interface (API) based upon the input data field from the form,
  link an output of an Internet of Things (IoT) sensor corresponding to the input data field to the API, and
  collect data output from the IoT sensor and populate the input data field in the form via the API.

2. The computing system of claim 1 wherein the first SaaS application session corresponds to a first SaaS application, and wherein the at least one client computing device is further configured to run a second SaaS application session corresponding to a second SaaS application different than the first SaaS application and provide data output from the IoT sensor and collected via the API to the second SaaS application session.

3. The computing system of claim 1 wherein the at least one client computing device is configured to dynamically generate the API based upon the input data field from the form.

4. The computing system of claim 1 wherein the at least one client computing device is configured to generate the API based upon an API template library.

5. The computing system of claim 1 wherein the at least one client computing device runs the first SaaS application session within an embedded browser, and wherein the form comprises a web browser form.

6. The computing system of claim 1 wherein the at least one client computing device is further configured to output a control parameter for the IoT sensor via the API.

7. The computing system of claim 6 wherein the control parameter comprises at least one of a power control parameter and a sensor configuration parameter.

8. The computing system of claim 1 wherein the at least one client computing device is configured to run an IoT hub application to generate the API and link the output of the IoT sensor to the API.

9. A method comprising:
 providing Software as a Service (SaaS) application sessions at a server;
 running a first one of the SaaS application sessions at a client computing device having a form including an input data field;
 generating an application program interface (API) at the client computing device based upon the input data field from the form;
 linking an output of an Internet of Things (IoT) sensor corresponding to the input data field to the API at the client computing device; and
 collecting data output from the IoT sensor and populating the input data field in the form via the API at the client computing device.

10. The method of claim 9 wherein the first SaaS application session corresponds to a first SaaS application, and further comprising running a second one of the SaaS application sessions at the client computing device corresponding to a second SaaS application different than the first SaaS application and providing data output from the IoT sensor and collected via the API to the second SaaS application session.

11. The method of claim 9 wherein generating the API comprises dynamically generating the API based upon the input data field from the form.

12. The method of claim 9 wherein generating the API comprises generating the API based upon an API template library.

13. The method of claim 9 wherein running the first SaaS application session comprises running the first SaaS application session within an embedded browser, and wherein the form comprises a web browser form.

14. The method of claim 9 further comprising outputting a control parameter from the client computing device for the IoT sensor via the API.

15. A non-transitory computer-readable medium having computer-executable instructions for causing a client computing device to perform steps comprising:
 running a first SaaS application session from a server and having a form including an input data field;
 generating an application program interface (API) based upon the input data field from the form;
 linking an output of an Internet of Things (IoT) sensor corresponding to the input data field to the API; and
 collecting data output from the IoT sensor and populating the input data field in the form via the API.

16. The non-transitory computer-readable medium of claim 15 wherein the first SaaS application session corresponds to a first SaaS application, and further having computer-executable instructions for causing the client computing device to run a second SaaS application session from the server corresponding to a second SaaS application different than the first SaaS application and provide data output from the IoT sensor and collected via the API to the second SaaS application session.

17. The non-transitory computer-readable medium of claim 15 wherein generating the API comprises dynamically generating the API based upon the input data field from the form.

18. The non-transitory computer-readable medium of claim 15 wherein generating the API comprises generating the API based upon an API template library.

19. The non-transitory computer-readable medium of claim 15 wherein running the first SaaS application session comprises running the first SaaS application session within an embedded browser, and wherein the form comprises a web browser form.

20. The non-transitory computer-readable medium of claim 15 further having computer-executable instructions for causing the client computing device to output a control parameter for the IoT sensor via the API.

* * * * *